(12) United States Patent
Hsiao et al.

(10) Patent No.: US 11,334,506 B2
(45) Date of Patent: May 17, 2022

(54) INTERFACE CONNECTION DEVICE, SYSTEM AND METHOD THEREOF

(71) Applicant: Realtek Semiconductor Corporation, Hsinchu (TW)

(72) Inventors: Cheng-Yuan Hsiao, Hsinchu (TW); Sung-Kao Liu, Hsinchu (TW); Wei-Hung Chuang, Hsinchu (TW); Li-Chiao Hung, Hsinchu (TW); Hung-Tai Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/159,468

(22) Filed: Jan. 27, 2021

(65) Prior Publication Data

US 2021/0374082 A1    Dec. 2, 2021

(30) Foreign Application Priority Data

May 28, 2020   (TW) .................................. 109117917

(51) Int. Cl.
*G06F 13/20* (2006.01)
*G06F 13/42* (2006.01)

(52) U.S. Cl.
CPC .......... *G06F 13/20* (2013.01); *G06F 13/4282* (2013.01); *G06F 2213/0026* (2013.01); *G06F 2213/0032* (2013.01); *G06F 2213/0042* (2013.01)

(58) Field of Classification Search
CPC ..... G06F 1/325; G06F 11/273; G06F 13/4256
See application file for complete search history.

(56) References Cited

U.S. PATENT DOCUMENTS

| | | | |
|---|---|---|---|
| 2011/0153888 A1* | 6/2011 | Sun ..................... | G06F 13/4256 710/107 |
| 2011/0231685 A1* | 9/2011 | Huang .................... | G06F 1/325 713/321 |
| 2017/0188338 A1* | 6/2017 | Lu .......................... | G06F 13/385 |
| 2017/0370964 A1* | 12/2017 | Chen ..................... | G06F 11/273 |

* cited by examiner

*Primary Examiner* — Getente A Yimer
(74) *Attorney, Agent, or Firm* — Locke Lord LLP; Tim Tingkang Xia, Esq.

(57) ABSTRACT

An interface connection method applied to a connection device. The connection device is configured to connect a host end having a first connection interface and a device end having a second connection interface. The interface connection method includes determining a voltage level of a detection pin; performing a first initialization when the detection pin is at a low level; providing an electrical power for detecting whether the electrical power is consumed or not when the detection pin is at a high level; sending a link signal when the electrical power is consumed; and performing a second initialization when the device end is detected to be in a ready state.

10 Claims, 2 Drawing Sheets

INTERFACE CONNECTION DEVICE, SYSTEM AND METHOD THEREOF

CROSS-REFERENCE TO RELATED APPLICATION

This application claims priority to Taiwan Application Serial Number 109117917, filed May 28, 2020, which is herein incorporated by reference in its entirety.

BACKGROUND

Field of Invention

This disclosure relates to an interface connection device, system and method thereof, and in particular to a high speed interface connection device, system and method thereof.

Description of Related Art

Following the development of technology, many connection interfaces for high speed data transmission are presented, e.g. USB (universal serial bus), SATA (serial advanced technology attachment), PCIE (personal computer interface express).

A connection device is required to provide communication between devices having different connection interfaces, e.g. USB-to-SATA connection device, USB-to-PCIE connection device. However, although SATA and PCIE are products that are applied to a M.2 standard, the connection device can only support one of them.

Therefore, the issue of present field is how to design a connection device that can support both SATA and PCIE to solve the problem described above.

SUMMARY

An aspect of present disclosure relates to an interface connection method. The interface connection method is applied to a connection device, which is configured to connect a host end having a first connection interface and a device end having a second connection interface. The interface connection method includes determining a voltage level of a detection pin; performing a first initialization when the detection pin is at a low level; providing an electrical power for detecting whether the electrical power is consumed or not when the detection pin is at a high level; sending a link signal when the electrical power is consumed; and performing a second initialization when the device end is detected to be in a ready state.

Another aspect of present disclosure relates to an interface connection device. The interface connection device is configured to allow a host end having a first connection interface and a device end having a second connection interface to be electrically coupled to each other. The interface connection device includes a first port, a second port and a control circuit. The first port is configured to communicate and be electrically coupled to the first connection interface. The second port is configured to communicate and be electrically coupled to the second connection interface. The control circuit is electrically coupled to the first port and the second port and is configured to execute following operations: determining a voltage level of a detection pin of the second port; performing a first initialization through the second port when the detection pin is at a low level; providing an electrical power through the second port when the detection pin is at a high level; sending a link signal through the second port when consumption of the electrical power is detected; and performing a second initialization through the second port when the device end is detected to be in a ready state through the second port.

Another aspect of present disclosure relates to an interface connection system. The interface connection system includes a host end, a device end and a connection device. The host end has a first connection interface. The device end has a second connection interface. The connection device allows the first connection interface and the second connection interface to be electrically coupled to each other. The connection device is configured to execute following operations: determining a voltage level of a detection pin configured to be coupled to the second connection interface; performing a first initialization through the second connection interface when the detection pin is at a low level; providing an electrical power to the second connection interface when the detection pin is at a high level; sending a link signal to the second connection interface when consumption of the electrical power is detected; and performing a second initialization through the second connection interface when the device end is detected to be in a ready state.

In summary, determining whether the electronic device is the SATA device or not according to the voltage level (e.g. high level or low level) of the pin, and determining whether the electronic device is the PCIE device or not according to whether the provided electrical power is consumed or not as well as whether the electronic device responds to the PCIE link signal or not. In such way, whether a device having a SATA interface or another device having a PCIE interface is connected to the host device 110 having a USB interface, the single connection device can support the connection between the device and the host device.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

Figure 1:
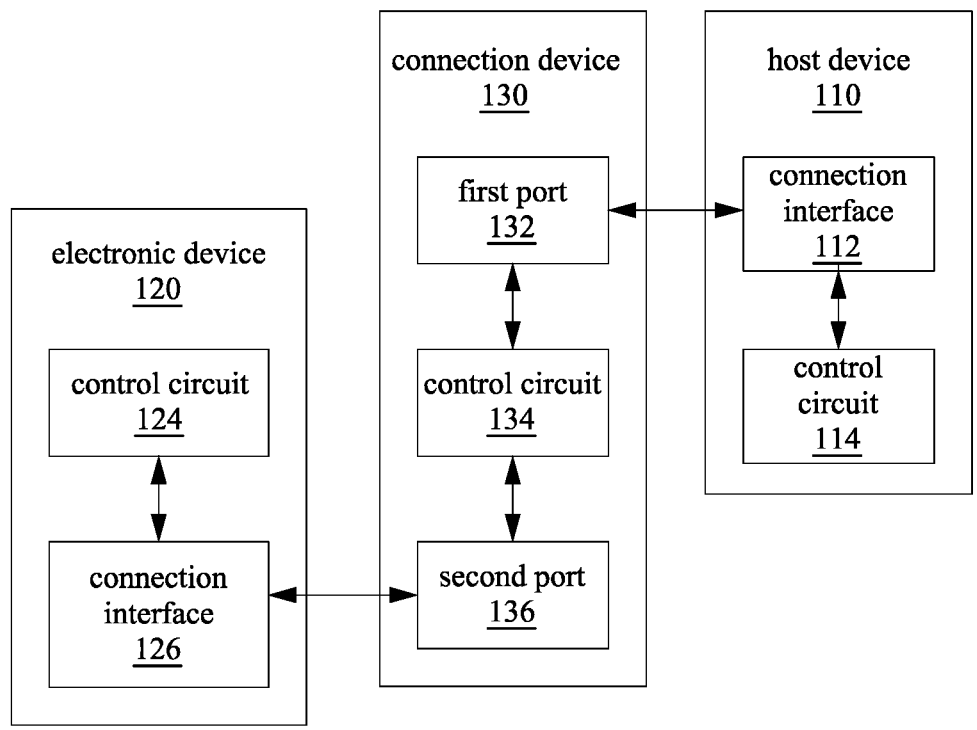
FIG. 1 is a schematic diagram of an interface connection system according to some embodiments of the present disclosure.

Referring to FIG. 1. FIG. 1 is a schematic diagram of an interface connection system 100 according to some embodiments of the present disclosure. As shown in FIG. 1, the interface connection system 100 includes a host device 110

(that is, a host end), an electronic device 120 (that is, a device end) and a connection device 130.

The host device 110 has a connection interface 112 and a control circuit 114. In some embodiments, the host device 110 can be a desktop computer, a laptop computer or a handheld electronic device (e.g. smartphone), but the present application is not limited thereto. The connection interface 112 can be a USB (universal serial bus).

The electronic device 120 has a control circuit 124 and a connection interface 126. In some embodiments, the electronic device 120 can be a data storage device, but the present application is not limited thereto. The connection interface 126 can be a SATA (serial advanced technology attachment) or a PCIE (personal computer interface express).

In other words, the connection interface 112 of the host device 110 and the connection interface 126 of the electronic device 120 are two different types of data transmission interfaces.

The connection device 130 is configured to act as an adaptor to support the connection between the host device 110 and the electronic device 120 having different connection interfaces. That is to say, the connection device 130 is configured to allow the host device 110 having the connection interface 112 and the electronic device 120 having the connection interface 126 to be electrically coupled to each other, so that the host device 110 and the electronic device 120 are allowed to communicate and/or transmit data to each other through the connection device 130.

Specifically, the connection device 130 includes a first port 132, a control circuit 134 and a second port 136. As shown in FIG. 1, the first port 132 of the connection device 130 is configured to communicate and be electrically coupled to the connection interface 112. The second port 136 is configured to communicate and be electrically coupled to the connection interface 126. The control circuit 134 of the connection device 130 is connected to the first port 132 and the second port 136.

In such way, by connecting the connection device 130 to the electronic device 120 and the host device 110, the electronic device 120 and the host device 110 can transmit data through the connection device 130.

Figure 2:
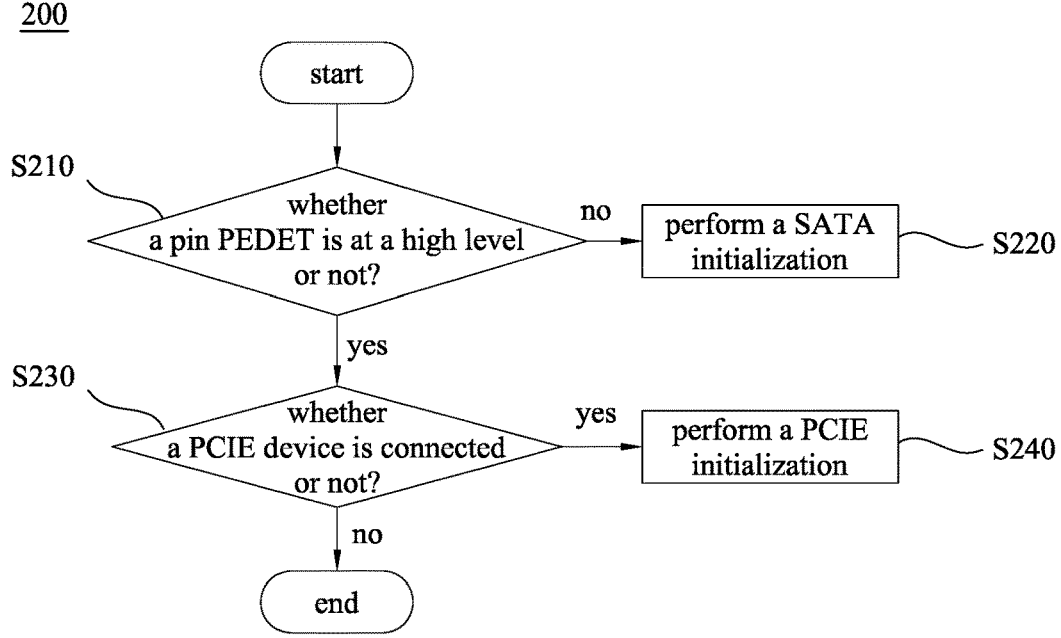
FIGS. 2-3 are flow diagrams of an interface connection method according to some embodiments of the present disclosure.
Figure 3:
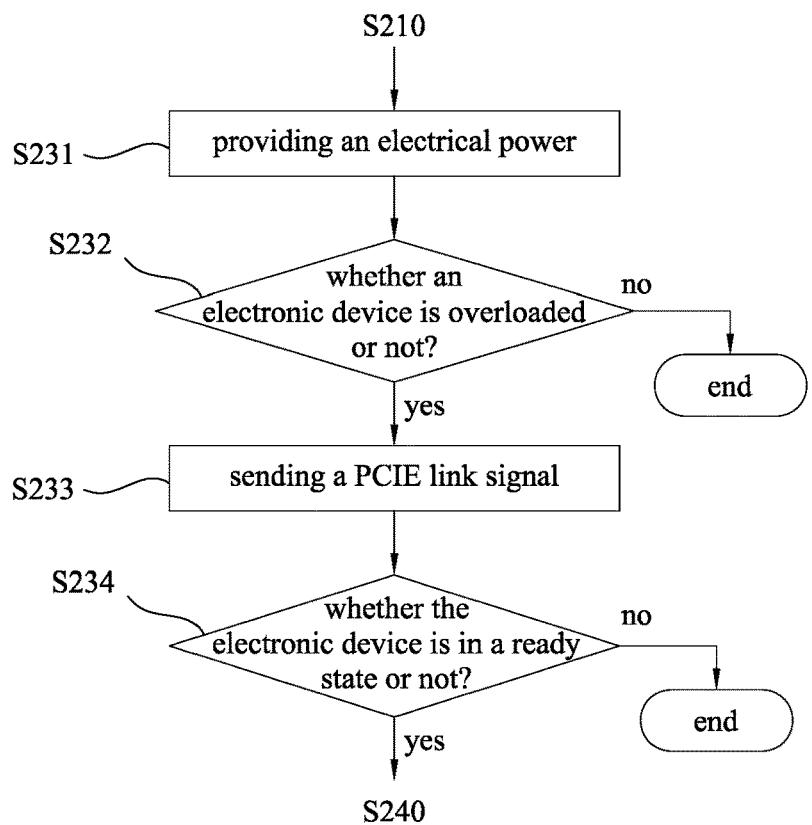

Referring to FIGS. 2-3, FIGS. 2-3 are flow diagrams of an interface connection method 200 according to some embodiments of the present disclosure. Specifically, the interface connection method 200 is applied to the connection device 130. For the convenience and clarity of description, the following interface connection method 200 is described with reference to the embodiment as shown in FIG. 1. However, the present disclosure should not be limited thereto. It will be apparent to those skilled in the art that various modifications and variations can be made to the structure of the present disclosure without departing from the scope or spirit of the invention. As shown in FIG. 2, the interface connection method 200 includes operations S210, S220, S230 and S240.

First, in the operation S210, the connection device 130 determines whether a pin PEDET (that is, a detection pin) is at a high level or a low level. Specifically, in the M.2 standard, the pin PEDET is at the low level (a logic 0) when the SATA device is connected. By contrast, the pin PEDET is at the high level (a logic 1) when the PCIE device is connected. Therefore, after the connection device 130 is powered (for example, the first port 132 receives an electrical power provided by the host device 110 through the connection interface 112), the connection device 130 determines whether the pin PEDET of the second port 136 is at the high level or the low level.

When the pin PEDET is at the low level, the connection device 130 determines the connected electronic device 120 is the SATA device and executes the operation S220 to perform a SATA initialization. Specifically, the control circuit 134 of the connection device 130 performs the SATA initialization on the electronic device 120 through the second port 136 and the connection interface 126.

By contrast, when the pin PEDET is at the high level, it presents that the connection device 130 is not connected or the connected electronic device 120 is the PCIE device. Therefore, the operation S230 is executed, so that the connection device 130 sends an initialization command related to the PCIE to determine whether the PCIE device is connected or not.

When the connection device 130 determines that the connected electronic device 120 is the PCIE device, the operation S240 is executed to perform a PCIE initialization by the connection device 130. Specifically, the control circuit 134 of the connection device 130 performs the PCIE initialization on the electronic device 120 through the second port 136 and the connection interface 126. By contrast, when the connection device 130 determines that it is not connected to the electronic device 120 or the electronic device 120 is not the PCIE device, the operation is ended.

As shown in FIG. 3, the operation S230 includes operations S231, S232, S233 and S234. In the operation S231, the connection device 130 provides a main electrical power to the electronic device 120. Specifically, the connection device 130 receives the electrical power provide by the host device 110 through the first port 132 and the connection interface 112. The connection device 130 then provides the corresponding electrical power to the electronic device 120 through the second port 136 and the connection interface 126.

Then, in the operation S232, the connection device 130 determines whether the main electrical power provided to the electronic device 120 is overloaded or not. Specifically, the connection device 130 detects whether the electrical power is consumed or not through the second port 136.

When the connection device 130 determines the electrical power is not consumed (that is, the main electrical power provided to the electronic device 120 is not overloaded), it presents that the connection device 130 is not connected to the electronic device 120, so that the operation is ended.

When the connection device 130 determines the electrical power is consumed (that is, the main electrical power provided to the electronic device 120 is overloaded), it presents that the connection device 130 is connected to the electronic device 120, so that the operation S233 is executed to send a PCIE link signal by the connection device 130. Specifically, the control circuit 134 of the connection device 130 sends the PCIE link signal to the connection interface 126 through the second port 136. Then, in the operation S234, the connection device 130 determines whether the electronic device 120 is in a ready state (L0) or not.

For example, in the operations S233 and S234, the connection device 130 performs a link training on the electronic device 120 through the second port 136. The link training can include detect, polling and configuration. When the electronic device 120 finishes the link training, it is in the ready state.

If the electronic device 120 is not in the ready state, the electronic device 120 is not the PCIE device, and therefore the operation is ended. If the electronic device 120 is in the ready state, the electronic device 120 is determined to be the PCIE device, and the operation S240 is executed to perform the PCIE initialization by the connection device 130.

Although the disclosed method is shown and described herein as a series of steps or events, it should be understood that the order of the steps or events shown should not be interpreted as limiting. For example, some steps may occur in a different order and/or simultaneously with other steps or events than those shown and/or described herein. In addition, not all of the steps shown here are necessary to implement one or more aspects or embodiments described herein. In addition, one or more steps herein may also be performed in one or more separate steps and/or stages.

In summary, determining whether the electronic device 120 is the SATA device or not according to the voltage level (e.g. high level or low level) of the pin PEDET, and determining whether the electronic device 120 is the PCIE device or not according to whether the provided electrical power is consumed or not as well as whether the electronic device 120 responds to the PCIE link signal or not. In such way, whether a device having a SATA interface or another device having a PCIE interface is connected to the host device 110 having a USB interface, the single connection device 130 can support the connection between the device and the host device 130.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. An interface connection method applied to a connection device, which is configured to connect a host end having a first connection interface and a device end having a second connection interface, and comprising:
    determining a voltage level of a detection pin;
    performing a first initialization when the detection pin is at a low level;
    providing an electrical power for detecting whether the electrical power is consumed or not when the detection pin is at a high level;
    sending a link signal when the electrical power is consumed; and
    performing a second initialization by the connection device when the device end is detected to be in a ready state by the connection device,
    wherein the second connection interface is a serial advanced technology attachment and a personal computer interface express, the first initialization is a serial advanced technology attachment initialization, and the second initialization is a personal computer interface express initialization.

2. The interface connection method of claim 1, wherein the first connection interface is a universal serial bus.

3. The interface connection method of claim 1, further comprising:
    receiving the electrical power provided by the host end through the first connection interface.

4. An interface connection device configured to allow a host end having a first connection interface and a device end having a second connection interface to be electrically coupled to each other, wherein the interface connection device comprises:
    a first port configured to communicate and be electrically coupled to the first connection interface;
    a second port configured to communicate and be electrically coupled to the second connection interface; and
    a control circuit electrically coupled to the first port and the second port and configured to execute following operations:
    determining a voltage level of a detection pin of the second port;
    performing a first initialization through the second port when the detection pin is at a low level;
    providing an electrical power through the second port when the detection pin is at a high level;
    sending a link signal through the second port when consumption of the electrical power is detected; and
    performing a second initialization by the connection device through the second port when the device end is detected to be in a ready state through the second port by the connection device,
    wherein the second connection interface is a serial advanced technology attachment and a personal computer interface express, the first initialization is a serial advanced technology attachment initialization, and the second initialization is a personal computer interface express initialization.

5. The interface connection device of claim 4, wherein the first connection interface is a universal serial bus.

6. The interface connection device of claim 4, wherein the control circuit is further configured to receive the electrical power, which is provided by the host end through the first connection interface, from the first port.

7. An interface connection system, comprising:
    a host end having a first connection interface;
    a device end having a second connection interface; and
    a connection device allowing the first connection interface and the second connection interface to be electrically coupled to each other, wherein the connection device is configured to execute following operations:
    determining a voltage level of a detection pin configured to be coupled to the second connection interface;
    performing a first initialization through the second connection interface when the detection pin is at a low level;
    providing an electrical power to the second connection interface when the detection pin is at a high level;
    sending a link signal to the second connection interface when consumption of the electrical power is detected; and
    performing a second initialization by the connection device through the second connection interface when the device end is detected to be in a ready state by the connection device;
    wherein the second connection interface is a serial advanced technology attachment and a personal computer interface express, the first initialization is a serial advanced technology attachment initialization, and the second initialization is a personal computer interface express initialization.

8. The interface connection system of claim 7, wherein the connection device comprises:
    a first port configured to communicate and be electrically coupled to the first connection interface;
    a second port configured to communicate and be electrically coupled to the second connection interface; and a control circuit electrically coupled to the first port and the second port.

9. The interface connection system of claim 7, wherein the first connection interface is a universal serial bus.

10. The interface connection system of claim 7, wherein the connection device is configured to receive the electrical power provided by the host end through the first connection interface.

\* \* \* \* \*